United States Patent
Chang

(10) Patent No.: US 6,948,842 B2
(45) Date of Patent: Sep. 27, 2005

(54) LIGHT EMITTING DIODE ARRAY ILLUMINANT AND BACKLIGHT MODULE BY USING THE SAME

(75) Inventor: Yi-Hui Chang, Hsinchu (TW)

(73) Assignee: Toppoly Optoelectronics Corp., Miao-Li (TW)

( * ) Notice: Subject to any disclaimer, the term of this patent is extended or adjusted under 35 U.S.C. 154(b) by 125 days.

(21) Appl. No.: 10/604,541

(22) Filed: Jul. 30, 2003

(65) Prior Publication Data

US 2004/0212982 A1 Oct. 28, 2004

(51) Int. Cl.$^7$ ................................................ F21V 7/04
(52) U.S. Cl. ...................... 362/612; 362/613; 362/631; 362/555
(58) Field of Search ........................... 362/31, 26, 561, 362/555; 349/65

(56) References Cited

U.S. PATENT DOCUMENTS

| | | | |
|---|---|---|---|
| 4,964,025 A | * 10/1990 | Smith | ........................ 362/346 |
| 5,325,271 A | * 6/1994 | Hutchisson | .................. 362/555 |
| 5,585,783 A | * 12/1996 | Hall | ............................ 340/473 |
| 5,726,535 A | * 3/1998 | Yan | ......................... 315/185 R |
| 5,750,974 A | * 5/1998 | Sasaki et al. | ................ 235/454 |
| 6,467,921 B2 | * 10/2002 | Lange | .......................... 362/29 |
| 6,539,656 B2 | * 4/2003 | Maas et al. | .................... 40/546 |
| 6,550,927 B1 | * 4/2003 | Messel | ......................... 362/24 |

* cited by examiner

Primary Examiner—Thomas M. Sember
Assistant Examiner—James W Cranson, Jr.
(74) Attorney, Agent, or Firm—Jiang Chyun IP offic

(57) ABSTRACT

The present invention provides a light emitting diode array illuminant and a backlight module by using the same, which comprises at least a carrier and a plurality of light emitting diodes. The carrier comprises a front surface and a back surface, and a plurality set of contacts are disposed on the front surface and back surface of the carrier. The light emitting diodes are disposed on the carrier, and are electrically connected to the contacts of each set, respectively. The illuminant provided by the light emitting diodes emits a light from a side of the carrier. The present invention further applies the light emitting diode array illuminant to a backlight module, so that it can be activated under low temperature and also protects the backlight module from over heating after it is activated.

11 Claims, 3 Drawing Sheets

LIGHT EMITTING DIODE ARRAY ILLUMINANT AND BACKLIGHT MODULE BY USING THE SAME

BACKGROUND OF INVENTION

1. Field of Invention

The present invention relates to an illuminant and a backlight module (B/L) by using the same, and more particularly, to a light emitting diode (LED) array illuminant and a backlight module by using the same.

2. Description of Related Art

The video products, especially the digital video or image device has become a common used product in general daily life. Within various digital video or image devices, the display is one significant element for displaying related information. The user can read information from the display, and further controls the operation of the device. Further, the size of the video or image device is getting thinner and lighter day by day for adapting with the pace of the modern life. Although the conventional Cathode Ray Tube (CRT) display has its advantages, since it takes a large size and consumes a great amount of electricity. Accordingly, in accordance with the photoelectricity technology and the semiconductor fabrication technology, the panel display, such as the Liquid Crystal Display (LCD), has developed and become the most popular display product now.

Since the LCD is a non self-emitting type display, in order to achieve the object of displaying, an illuminant, which can provide a sufficient light, has to be provided. According to various utilization types of the illuminant, the LCD can be categorized into the transmissive LCD, the reflective LCD, and the trans-reflective LCD. For example, the transmissive LCD or the trans-reflective LCD usually uses a backlight module as its main illuminant, and the backlight module is usually made of the components including a cold cathode fluorescent lamp (CCFL), which is used as an illuminant, a light guide panel (LGP), a reflective panel, and a lamp holder as shown in FIG. 1.

FIG. 1 schematically shows a sectional view of a conventional backlight module of the notebook computer. Referring to FIG. 1, the conventional backlight module 100 mainly comprises a CCFL 102, which is used as an illuminant, a light guide panel 104, and a lamp holder 106. Wherein, the light guide panel 104 comprises a light incident surface 103a, a light emitting surface 103b, and a light dispersing surface 103c. The lamp holder 106 is disposed correspondingly to the light incident surface 103a of the light guide panel 104, and the lamp 102 is disposed in the lamp holder 106, so that the light emitted from the lamp 102 is incident to the light guide panel 104 after it is gathered by the lamp 106.

However, since the diameter of the CCFL 102 is limited, the thickness of the overall backlight module is hard to reduce. Further, after long time operation, since the temperature rises, the portion of the light guide panel 104 near to the CCFL is easily to be yellowed, and further results in the problems of uneven color and the warped light guide panel 104. Further, the conventional CCFL 102 is not easy to activate under low temperature, in order to obtain an expected brightness, the CCFL 102 must warp up first in the early phase when the lamp is activated.

SUMMARY OF INVENTION

It is an object of the present invention to provide a light emitting diode array illuminant and a backlight module by using the same, so as to prevent the problems of the light guide panel yellowed or deformation from happening.

It is an further object of the present invention to provide a light emitting diode array illuminant and a backlight module by using the same, so as to reduce the thickness of the overall backlight module.

It is an another object of the present invention to provide a light emitting diode array illuminant and a backlight module by using the same, which can be activated under low temperature and without the process of warming up.

It is a further another object of the present invention to provide a light emitting diode array illuminant and a backlight module by using the same, so as to increase the brightness.

In accordance with the object mentioned above and others, the present invention provides a light emitting diode array illuminant, which comprises a carrier and a plurality of light emitting diodes. Wherein, the carrier comprises a front surface and a back surface, and a plurality set of contacts are disposed on the front surface and back surface of the carrier. The light emitting diodes are disposed on the carrier, wherein each light emitting diode is electrically connected to the contact of each set, respectively. The illuminant provided by the light emitting diodes emits a light from a side of the carrier.

The present invention further provides a light emitting diode array illuminant, which comprises a folded flexible printed circuit (FPC) plate and a plurality of light emitting diodes. The folded FPC plate comprises a first join area, a second join area, and a bending area, which connected to the first join area and the second join area. Wherein, the first join area comprises a plurality set of first contacts, and the second join area comprises a plurality set of second contacts. Further, the light emitting diodes are disposed on the first join area and the second join area, wherein each light emitting diode is electrically connected to the first contact of each set and the second contact of each set, and the illuminant provided by the light emitting diodes emits a light from a side of the folded FPC plate.

The present invention further provides a backlight module, which comprises a light guide panel and a light emitting diode array illuminant. Wherein, the light guide panel comprises a light incident surface, a light emitting surface, and a light dispersing surface. The light emitting diode array illuminant is disposed beside the light incident surface of the light guide panel. The light emitting diode array illuminant comprises a carrier and a plurality of light emitting diodes, wherein the carrier comprises a front surface and a back surface, and a plurality set of contacts are disposed on the front surface and back surface of the carrier. The light emitting diodes are disposed on the carrier, wherein each light emitting diode is electrically connected to the contact of each set, respectively. The illuminant provided by the light emitting diodes emits a light from a side of the carrier.

The present invention further provides a backlight module, which comprises a light guide panel and a light emitting diode array illuminant, wherein the light guide panel comprises a light incident surface, a light emitting surface, and a light dispersing surface. The light emitting diode array illuminant is disposed beside the light incident surface of the light guide panel, and comprises a folded FPC plate and a plurality of light emitting diodes. The folded FPC plate comprises a first join area, a second join area, and a bending area, which connected to the first join area and the second join area. Wherein, the first join area comprises a plurality set of first contacts, and the second join area comprises a plurality set of second contacts. Further, the light emitting diodes are disposed on the first join area and the second join area, wherein each light emitting diode is electrically connected to the first contact of each set and the second contact of each set, and the illuminant provided by the light emitting diodes emits a light from a side of the folded FPC plate.

The present invention uses a carrier and a plurality of light emitting diodes as an illuminant, so as to increase the brightness and prevent the conventional lamp high temperature problem resulted from the long time operation of the lamp from happening. Further, the thickness of the backlight module is not limited by the diameter of the CCFL as in the prior art. Accordingly, the illuminant according to the present invention can be activated under low temperature and the warm up time is also reduced.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

The major concept of the present invention is in that the illuminant of the backlight module in the LCD is constituted of a carrier and a plurality of light emitting diodes. The backlight module formed by using this concept has at least three types. Further details are described with referring to FIG. 2, FIG. 3A, FIG. 3B, FIG. 4A, and FIG. 4B hereinafter.

Figure 1:
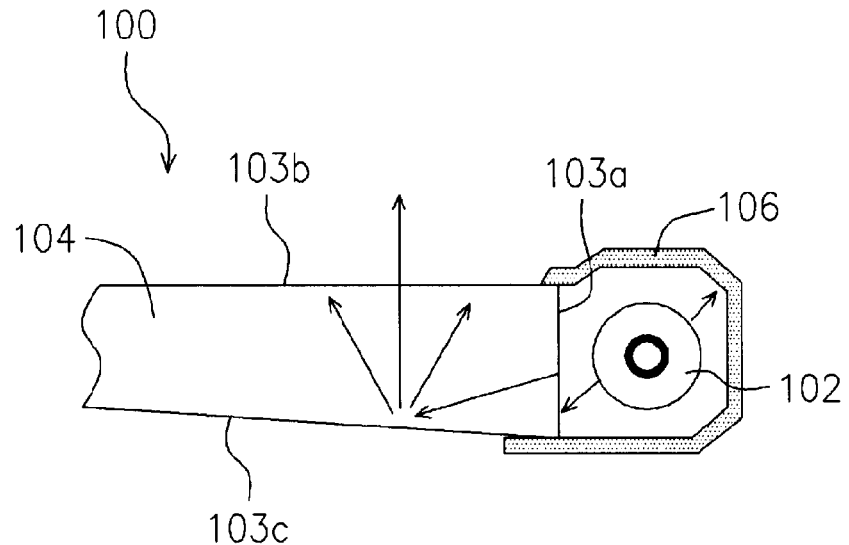
FIG. 1 schematically shows a sectional view of a conventional backlight module of the notebook computer.
Figure 2:
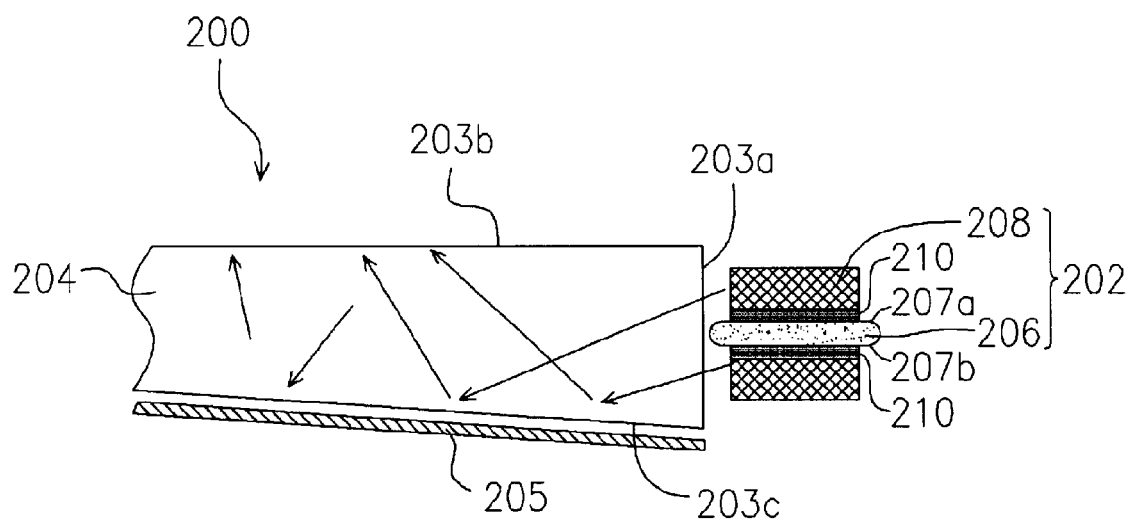
FIG. 2 schematically shows a sectional view of a backlight module of a first embodiment according to the present invention.

The First Embodiment: FIG. 2 schematically shows a sectional view of a backlight module (B/L) of a first embodiment according to the present invention.

Referring to FIG. 2, the backlight module 200 of the present embodiment comprises a light emitting diode (LED) array illuminant 202 and a light guide panel (LGP) 204, wherein the light guide panel 204 comprises a light incident surface 203a, a light emitting surface 203b, and a light dispersing surface 203c. The light emitting diode array illuminant 202 is disposed beside the light incident surface 203a of the light guide panel 204. The light emitting diode array illuminant 202 comprises a carrier 206 and a plurality of light emitting diodes 208, wherein the carrier 206 comprises a front surface 207a and a back surface 277b, and a plurality set of contacts 210 are disposed on the front surface 207a and the back surface 207b of the carrier 206. The carrier 206 is such as a Printed Circuit Board (PCB), and the light emitting diode 208 is such as a surface adhesion type light emitting diode element.

Referring to FIG. 2, the light emitting diodes 208 is disposed on the carrier 206, and each light emitting diode 208 is electrically connected to the contact 210 of each set, respectively. The illuminant provided by the light emitting diodes 208 emits a light from a side of the carrier 206. Further, if the light emitting diode 208 is a surface adhesion type light emitting diode, each light emitting diode 208 comprises a set of electrodes (not shown). The light emitting diodes 208 are electrically connected to the contacts 210 via the electrodes respectively and the light emitting diodes 208 are symmetrically disposed with each other or interleaved disposed. Further, a reflective panel 205 is disposed on the light dispersing surface 203c of the light guide panel 204, and some optical plates such as the diffusion plates and the light enhancement plates can be disposed on the light emitting surface 203b of the light guide panel 204.

Figure 3A:
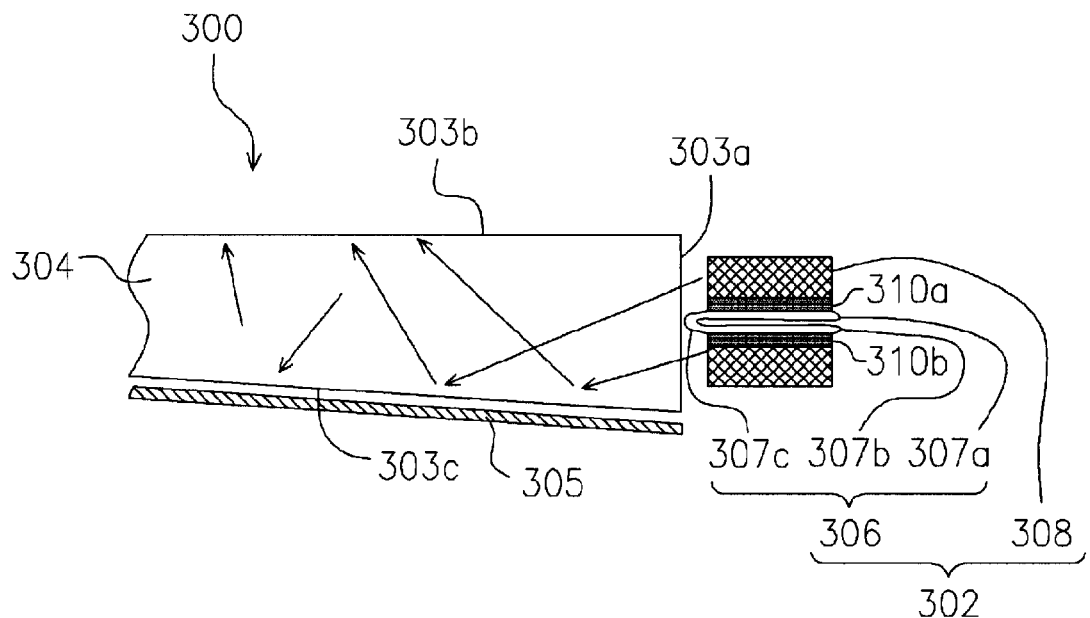
FIG. 3A schematically shows a sectional view of a backlight module of a second embodiment according to the present invention.

The Second Embodiment: FIG. 3A schematically shows a sectional view of a backlight module of a second embodiment according to the present invention.

Referring to FIG. 3A, the backlight module 300 of the present embodiment comprises a light emitting diode array illuminant 302 and a light guide panel 304, wherein the light guide panel 304 comprises a light incident surface 303a, a light emitting surface 303b, and a light dispersing surface 303c. The light emitting diode array illuminant 302 is disposed beside the light incident surface 303a of the light guide panel 304 and comprises a folded flexible printed circuit (FPC) plate 306 and a plurality of light emitting diodes 308. The folded FPC plate 306 comprises a first join area 307a, a second join area 307b, and a bending area 307c, which connected to the first join area 307a and the second join area 307b. Wherein, the first join area 307a comprises a plurality set of first contacts 310a, and the second join area 307b comprises a plurality set of second contacts 310b. The FPC plate 306 may be a single layer FPC plate or a multi-layer FPC plate, and the light emitting diode 308 is such as a surface adhesion type light emitting diode element.

Referring to FIG. 3A, the light emitting diodes 308 are disposed on the first join area 307a and the second join area 307b, wherein each light emitting diode 308 is electrically connected to the first contact 310a of each set and the second contact 310b of each set, and the illuminant provided by the light emitting diodes 308 emits a light from a side of the folded FPC plate 306. Further, if the light emitting diode 308 is a surface adhesion type light emitting diode, each light emitting diode 308 comprises a set of electrodes (not shown). The light emitting diodes 308 are electrically connected to the first contact 310a and the second contact 310b via the electrodes, respectively. The light emitting diodes 308 electrically connected to the first contact 310a and the light emitting diodes 308 electrically connected to the second contact 310b are symmetrically disposed with each other or interleaved disposed. Further, a reflective panel 305 is disposed on the light dispersing surface 303c of the light guide panel 304, and some optical plates such as the diffusion plates and the light enhancement plates can be disposed on the light emitting surface 303b of the light guide panel 304.

The light emitting diode array illuminant 302 of the present embodiment is described with referring to FIG. 3B hereinafter.

Figure 3B:
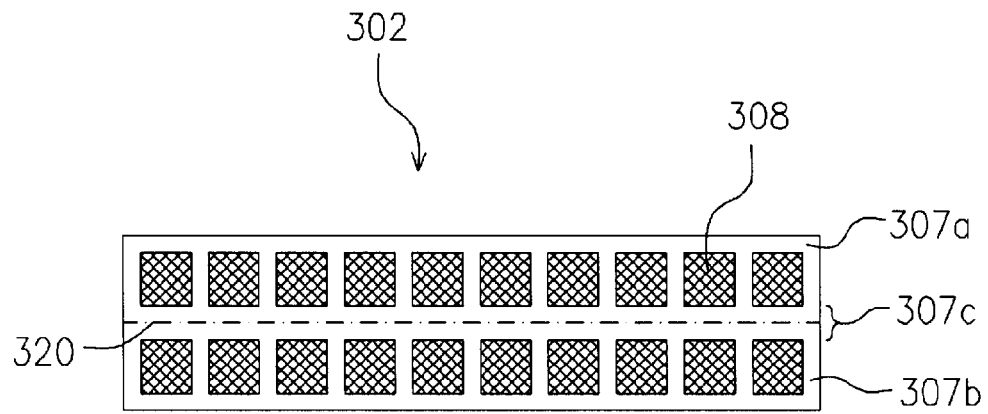
FIG. 3B schematically shows a top view expansion diagram of a light emitting diode array illuminant of the backlight module in FIG. 3A.

FIG. 3B schematically shows a top view expansion diagram of a light emitting diode array illuminant of the backlight module in FIG. 3A. Referring to FIG. 3B, the FPC plate 306 in the light emitting diode array illuminant 302 comprises a first join area 307a, a second join area 307b, and a bending area 307c, which is connected to the first join area 307a and the second join area 307b, and the light emitting diodes 308 are disposed on the FPC plate 306. The FPC plate 306 shown in the drawing is then folded from the boding line 320 and inserted into the backlight module 300 in FIG. 3A.

Figure 4A:
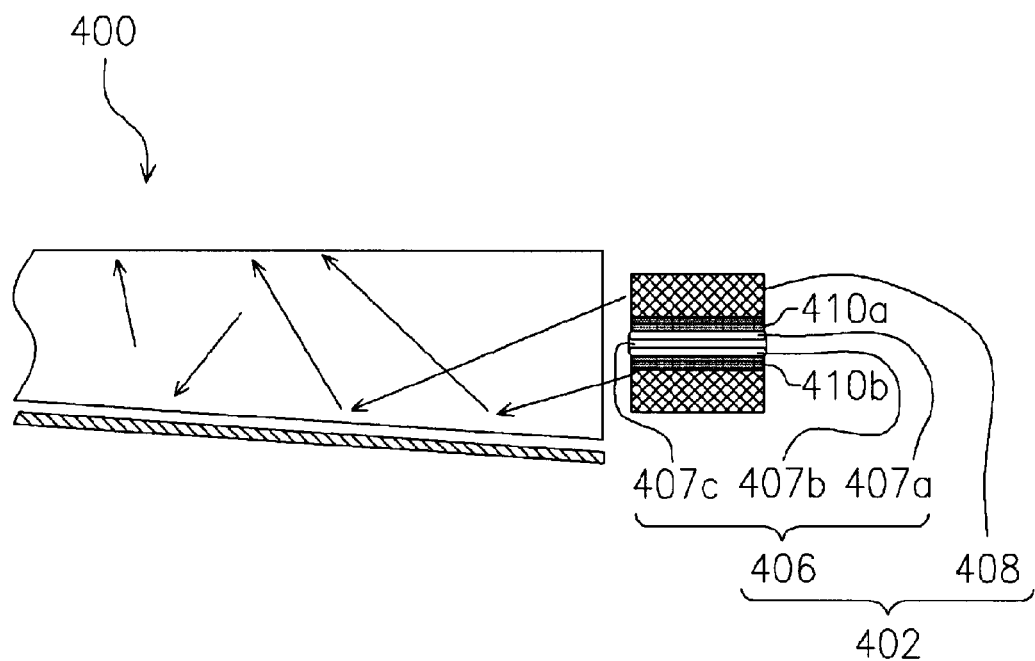
FIG. 4A schematically shows a sectional view of a backlight module of a third embodiment according to the present invention.

The Third Embodiment: FIG. 4A schematically shows a sectional view of a backlight module of a third embodiment according to the present invention.

Referring to FIG. 4A, the major difference between the backlight module 400 of the present embodiment from the backlight module 300 in FIG. 3A as mentioned above is in the style of the light emitting diode array illuminant 402. The light emitting diode array illuminant 402 of the present embodiment comprises a folded FPC plate 406 and a plurality of light emitting diodes 408. The folded FPC plate 406 comprises a first join area 407a, a second join area 407b, and a bending area 407c, which is connected to the first join area 407a and the second join area 407b. Wherein, the first join area 407a comprises a plurality set of first contacts 410a, and the second join area 407b comprises a plurality set of second contact 410b. The light emitting diode array illuminant 402 of the present embodiment is described with referring to FIG. 4B hereinafter.

Figure 4B:
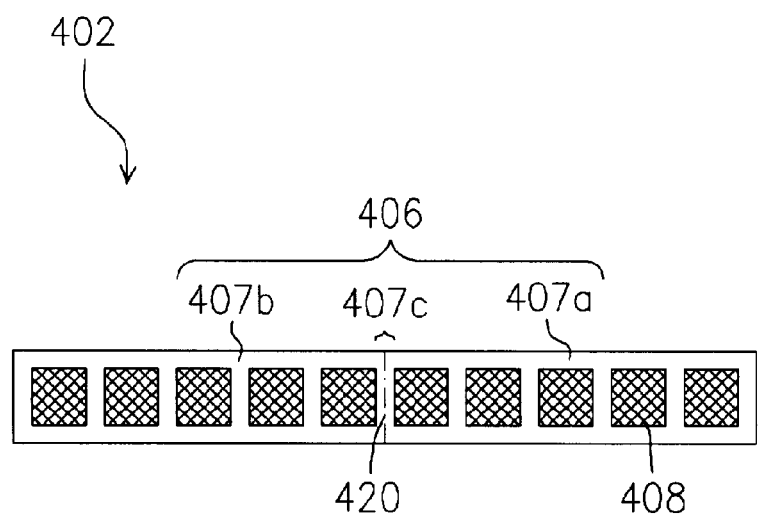
FIG. 4B schematically shows a top view expansion diagram of a light emitting diode array illuminant of the backlight module in FIG. 4A.

FIG. 4B schematically shows a top view expansion diagram of a light emitting diode array illuminant of the backlight module in FIG. 4A. Referring to FIG. 4B, the FPC plate 406 in the light emitting diode array illuminant 402 is folded from the boding line 420 and inserted into the backlight module 400 in FIG. 4A.

The present invention is characterized by using a carrier and a plurality of light emitting diodes as an illuminant of the backlight module, so as to increase the brightness. Further, the present invention uses the light emitting diodes as the illuminant, so as to prevent the conventional lamp high temperature problem resulted from the long time operation of the lamp from happening. Further, the thickness of the backlight module of the present invention is not limited by the diameter of the CCFL as in the prior art. Accordingly, the illuminant according to the present invention can be activated under low temperature and the warm up time is also reduced.

Although the invention has been described with reference to a particular embodiment thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A light emitting diode array illuminant, comprising:
   a folded FPC plate, comprising a first join area, a second join area, and a bending area, which is connected to the first join area and the second join area, wherein the first join area comprises a plurality set of first contacts, and the second join area comprises a plurality set of second contacts; and
   a plurality of light emitting diodes, disposed on the first join area and the second join area, wherein the light emitting diodes are electrically connected to the sets of first contacts and the sets of second contacts, and the illuminant provided by the light emitting diodes emits a light from a side of the folded FPC plate.

2. The light emitting diode array illuminant of claim 1, wherein the light emitting diodes electrically connected to the sets of first contacts and the light emitting diodes electrically connected to the sets of second contacts are symmetrically disposed with each other or interleaved disposed.

3. A backlight module, comprising:
   a light guide panel, comprising a light incident surface, a light emitting surface, and a light dispersing surface; and
   a light emitting diode array illuminant, disposed beside the light incident surface of the light guide panel, comprising:
      a carrier, wherein the carrier comprises a front surface and a back surface, and a plurality set of contacts are disposed on the front surface and the back surface of the carrier; and
      a plurality of light emitting diodes, disposed on the carrier, wherein the light emitting diodes are electrically connected to the sets of contacts, respectively, and the illuminant provided by the light emitting diodes emits a light from a side of the carrier.

4. The backlight module of claim 3, wherein the carrier comprises a Printed Circuit Board (PCB).

5. The backlight module of claim 3, wherein the carrier comprises a flexible printed circuit (FPC) plate.

6. The backlight module of claim 5, further comprising a carrier, wherein the FPC plate is either a single layer FPC plate or a multi-layer FPC plate.

7. The backlight module of claim 3, wherein the light emitting diodes are symmetrically disposed with each other or interleaved disposed.

8. The backlight module of claim 3, further comprising a reflective panel, wherein the reflective panel is disposed on the light dispersing surface.

9. A backlight module, comprising:
   a light guide panel, comprising a light incident surface, a light emitting surface, and a light dispersing surface; and
   a light emitting diode array illuminant, disposed beside the light incident surface of the light guide panel, comprising:
      a folded FPC plate, comprising a first join area, a second join area, and a bending area, which is connected to the first join area and the second join area, wherein the first join area comprises a plurality set of first contacts, and the second join area comprises a plurality set of second contacts; and
      a plurality of light emitting diodes, disposed on the first join area and the second join area, wherein the light emitting diodes are electrically connected to the sets of first contacts and the sets of second contacts, and the illuminant provided by the light emitting diodes emits a light from a side of the folded FPC plate.

10. The backlight module of claim 9, wherein the light emitting diodes electrically connected to the sets of first contacts and the light emitting diodes electrically connected to the sets of second contacts are symmetrically disposed with each other or interleaved disposed.

11. The backlight module of claim 9, further comprising a reflective panel, wherein the reflective panel is disposed on the light dispersing surface.

* * * * *